US009121954B2

(12) United States Patent
Pietig et al.

(10) Patent No.: US 9,121,954 B2
(45) Date of Patent: Sep. 1, 2015

(54) MULTIFRAME X-RAY DETECTOR FOR IMAGING SYSTEM WITH DISTRIBUTED X-RAY SOURCES (75) Inventors: Rainer Pietig, Herzogenrath (DE); Walter Ruetten, Linnich (DE); Christoph Herrmann, Aachen (DE)

(73) Assignee: Koninklijke Philips N.V., Eindhoven (NL)

( * ) Notice: Subject to any disclaimer, the term of this patent is extended or adjusted under 35 U.S.C. 154(b) by 374 days.

(21) Appl. No.: 13/583,093

(22) PCT Filed: Mar. 4, 2011

(86) PCT No.: PCT/IB2011/050924
§ 371 (c)(1),
(2), (4) Date: Sep. 6, 2012

(87) PCT Pub. No.: WO2011/110985
PCT Pub. Date: Sep. 15, 2011

(65) Prior Publication Data
US 2013/0003928 A1  Jan. 3, 2013

(30) Foreign Application Priority Data

Mar. 12, 2010 (EP) .................................... 10156363

(51) Int. Cl.
*G01T 1/24* (2006.01)
*G01T 1/17* (2006.01)
*H04N 5/32* (2006.01)

(52) U.S. Cl.
CPC . *G01T 1/247* (2013.01); *G01T 1/17* (2013.01); *H04N 5/32* (2013.01)

(58) Field of Classification Search
CPC ........... G01T 1/24; G01T 1/246; G01T 1/247; G01T 1/17; H04N 5/32; A61B 6/42; A61B 6/4233; A61B 6/4021; A61B 6/4028; A61B 6/4266
USPC ............................................... 378/62, 92, 98
See application file for complete search history.

(56) References Cited

U.S. PATENT DOCUMENTS 5,590,164 A * 12/1996 Kawai et al. ...................... 378/4
5,841,829 A * 11/1998 Dolazza et al. .................. 378/4
(Continued)

FOREIGN PATENT DOCUMENTS

DE 102008046722  3/2010
JP  H1080418 A  3/1998
(Continued)

OTHER PUBLICATIONS

C. Guohua, et al., "Temporal Multiplexing Radiography for dynbamic X-Ray Imagin", Review of Scientific Instruments 80, pp. 093902-1-093902-4.
Luhta et al, "A New 2D-Tiled Detector for Multislice CT", Medic Imaging, Proceedings of SPIE, vol. 6142, 2006, pp. 61420U-1-61420U-12.
(Continued)

*Primary Examiner* — Jack Berman (57) ABSTRACT

Device and method for synchronously switching activating a first and second charge accumulation section (31, 32) for a duration of a first and second predetermined sub-frame and a first and second X-ray source until lapse of a predetermined time frame for each of the first and second charge accumulation section (31, 32) for the accumulation of a plurality of temporally distributed partial charges according to an origin of a respective one of the plurality of spatially distributed X-ray sources so as to establish a specific relation between the focal spot position and a rule for accumulating the respective partial measurements, e.g. temporally distributed partial charges, belonging to the same focal spot positions, and to keep the focal spot temperature low by only activating the focal spot for a limited time according to a sub-frame.

24 Claims, 5 Drawing Sheets

(56) References Cited

U.S. PATENT DOCUMENTS

| | | |
|---|---|---|
| 7,139,367 B1 | 11/2006 | Le |
| 2008/0013677 A1 | 1/2008 | Possin et al. |
| 2009/0196393 A1 | 8/2009 | Wang et al. |
| 2010/0172466 A1 | 7/2010 | Herrmann et al. |

FOREIGN PATENT DOCUMENTS

| | | |
|---|---|---|
| WO | WO2007066243 | 6/2007 |
| WO | 2008020379 A2 | 2/2008 |
| WO | WO2008030379 | 3/2008 |

OTHER PUBLICATIONS

C. Guohua, et al., "Temporal Multiplexing Radiography for dynbamic X-Ray Imagin", Review of Scientific Instruments 80, pp. 093902-1-093902-4, published online Sep. 4, 2009.

G. Yang, et al., "Stationary Digital Breast Tomosynthesis System with a Multi-Beam Field Emission X-Ray Source Array", pp. 1-10.

Kraft et al, Counting and Integrating Mecroelectronics Development for Direct Conversion X-Ray Imaging (CIX 0.2), Technical Note PR-TN 2006/00726, Koninklijke Philps Electronics N.V. 2007, pp. 10152.

* cited by examiner

MULTIFRAME X-RAY DETECTOR FOR IMAGING SYSTEM WITH DISTRIBUTED X-RAY SOURCES

FIELD OF THE INVENTION

The present invention relates to an X-ray detector, an X-ray detector array, an X-ray imaging system and a corresponding method as well as a computer program element and a computer readable medium for a multi-frame X-ray detection with distributed X-ray sources, and in particular to respective devices and a method which can integrate multiple frames in parallel.

BACKGROUND OF THE INVENTION

X-ray imaging systems having a plurality of distributed X-ray sources are used to allow a fast switching between several focal spot positions without the need for moving the respective X-ray tube.

From U.S. Pat. No. 7,139,367 B1, a time-share digital integration method and apparatus for processing X-ray images is known, according to which a method and apparatus for processing signals output from an array of X-ray radiation detectors receive X-ray radiation emanating from an object irradiated by a source beam of X-ray radiation, to thereby produce a visual image of internal object features, utilizing repetitive sampling a couple of times and digital accumulation of signals output from each detector to increase signal-to-noise ratio of the images by a certain factor.

SUMMARY OF THE INVENTION

It is an object of the present invention to avoid a fast temperature increase of a focal spot of distributed X-ray sources.

The object of the present invention is solved by the subject-matter of the independent claims, wherein further embodiments are incorporated in the dependent claims.

It should be noted that the following described aspects of the invention apply also for the detector, the detector array, the imaging system, the method, the program element and the computer readable medium.

According to an aspect of the invention, an X-ray detector comprises an X-ray sensitive element having a charge output, a charge determination device being adapted to accumulate a plurality of temporally distributed partial charges according to a respective one of a plurality of spatially distributed X-ray sources, a readout device being adapted for reading out the charge determination device, wherein the charge determination device is connected to the charge output of the X-ray sensitive element via an accumulation activation device, wherein the charge accumulation device is connected to a readout line via a readout activation device.

Such a detector allows to decrease the focal spot temperature of the spatially distributed X-ray sources by accumulating temporally distributed partial charges, so that the entire charge quantity being necessary for a signal-to-noise ratio of a certain quality can be distributed over a plurality of sub-frames, so that each of the plurality of spatially distributed X-ray sources, in particular the focal spots thereof, are only impacted for a duration of a certain time. The X-ray detector of the invention allows accumulating the distributed partial charges in order to obtain the total charges for each of the plurality of spatially distributed X-ray sources, in particular the focal spots thereof, and to provide a respective output signal.

According to another aspect of the invention, there is provided a method for multi-frame X-ray detection with distributed X-ray sources, comprising synchronously activating a first charge accumulation section for a duration of a first predetermined sub-frame and a first X-ray source out of a plurality of distributed X-ray sources, synchronously switching activating from the first charge accumulation section to a second charge accumulation section for a duration of a second predetermined sub-frame and from a first X-ray source to a second X-ray source out of a plurality of distributed X-ray sources, repeating synchronously activating and synchronously switching activating until lapse of a predetermined time frame for each of the first and second charge accumulation section, the time frame consisting of a plurality of sub-frames, for the accumulation of a plurality of temporally distributed partial charges according to an origin of a respective one of the plurality of spatially distributed X-ray sources, and sequentially reading out the first charge accumulation section and the second charge accumulation section after lapse of the predetermined time frame for each of the first and second charge accumulation section.

This allows a synchronous switching of a respective X-ray source and a respective detector section for only a limited duration of a sub-frame, respectively, in order to avoid the increase of a focal spot temperature.

It should be noted that the present invention is not limited to a first and second charge accumulation section, a first and second predetermined sub-frame, a first and second X-ray source, etc., but also may include a plurality of charge accumulation sections, a plurality of predetermined sub-frames, a plurality of X-ray sources etc., the activation may by successively synchronized.

It can be seen as the gist of the invention to establish a specific relation between the focal spot position and a rule for accumulating the respective partial measurements, e.g. temporally distributed partial charges, belonging to the same focal spot positions, and to keep the focal spot temperature low by only activating the focal spot for a limited time according to a sub-frame. Reading out the accumulated charges only after accumulating a plurality of distributed partial charges for each focal spot reduces the required data rate and improves signal to noise ratio.

These and other aspects of the present invention will become apparent from and elucidated with reference to the embodiments described hereinafter.

BRIEF DESCRIPTION OF THE DRAWINGS

Exemplary embodiments of the invention will be described in the following with reference to the following drawings.

DETAILED DESCRIPTION OF EMBODIMENTS

Figure 1:
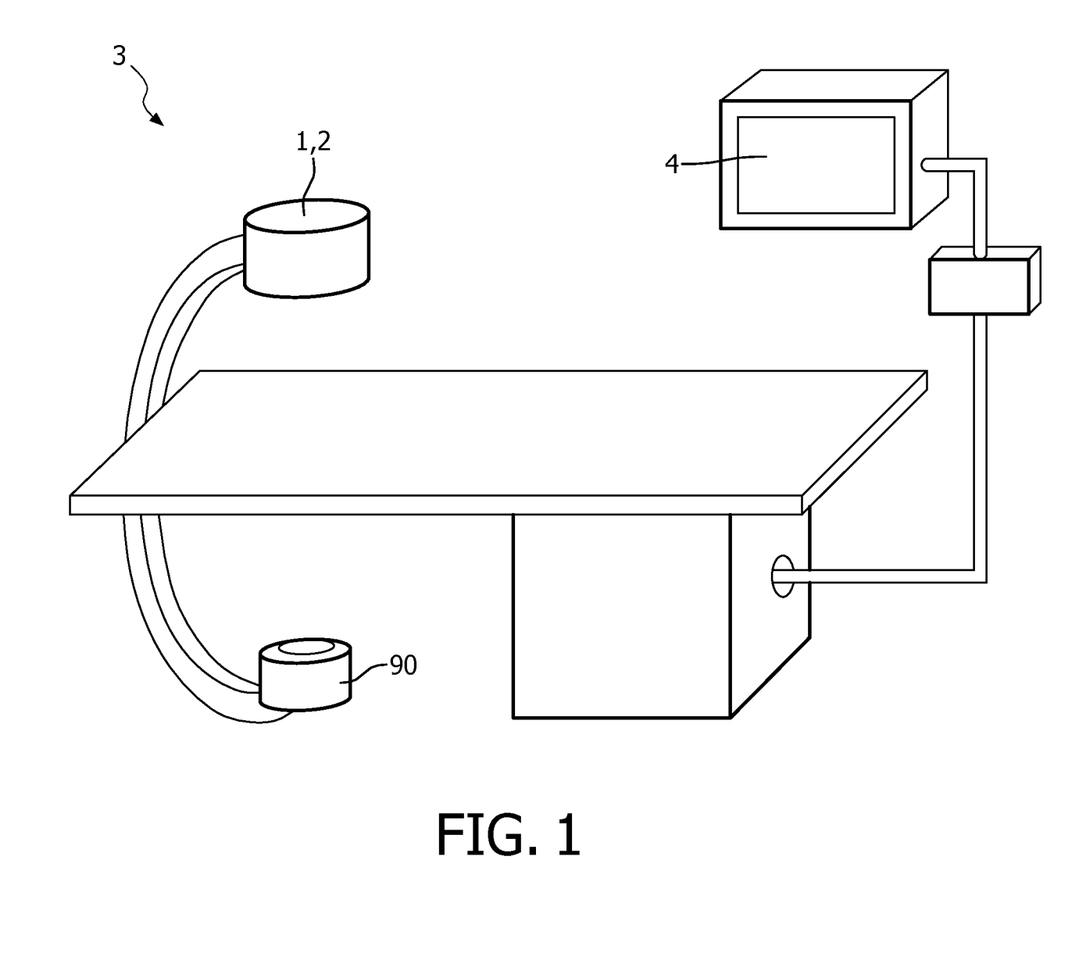
FIG. 1 illustrates an X-ray imaging system according to an exemplary embodiment of the invention.

FIG. 1 illustrates an X-ray imaging system comprising of an X-ray source 90 and an X-ray detector 1 and an X-ray detector array 2, respectively. The X-ray detector 1, 2 and the X-ray source 90 are geometrically arranged to each other in a predetermined position. Thus, it is possible to obtain an efficient imaging without the need for repeated adjustment. The X-ray detector and the X-ray source are connected to a control unit 80 (not shown in FIG. 1) wherein the X-ray imaging system may comprise a display unit 4 allowing to immediately display the results of the examination.

Figure 2:
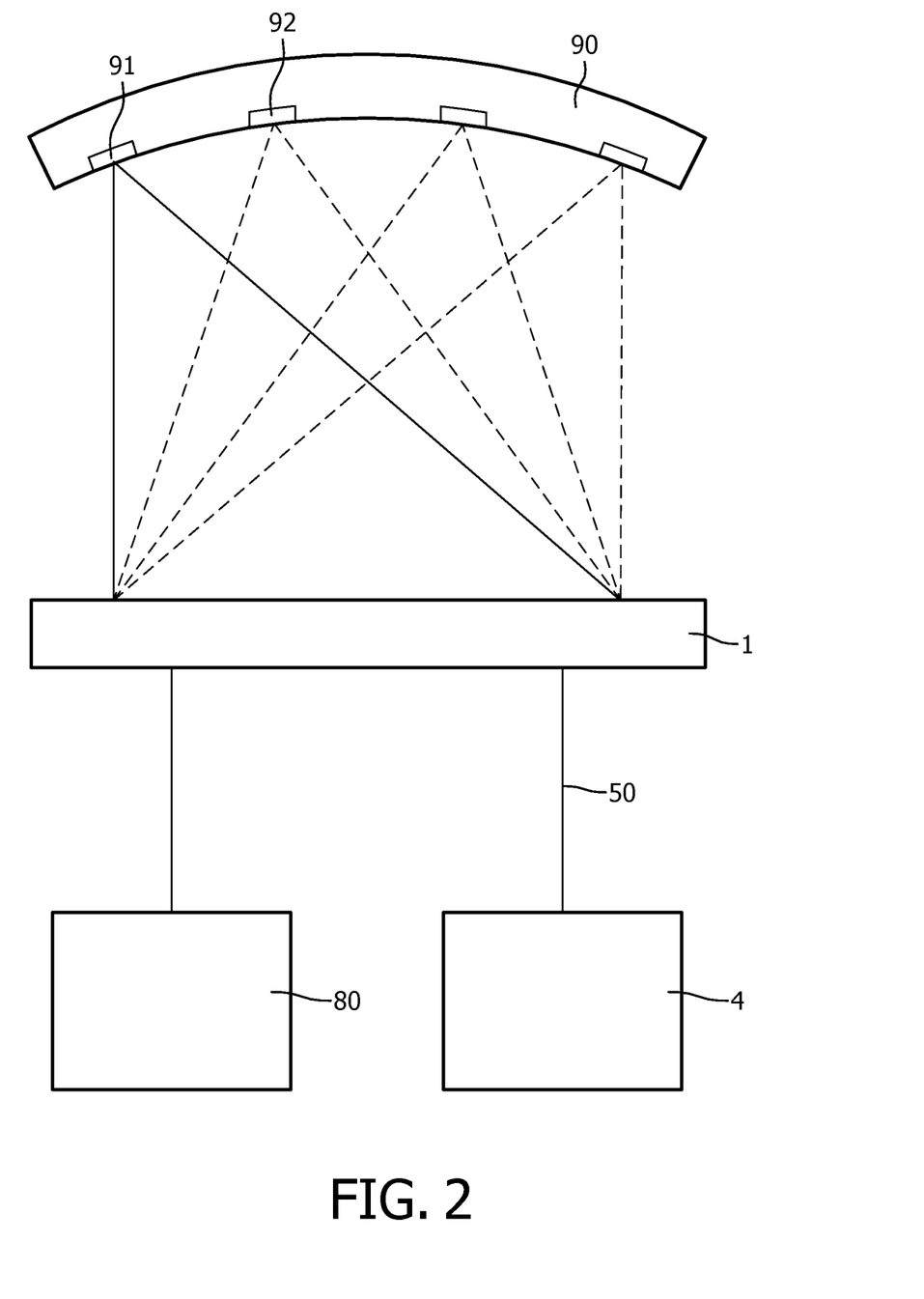
FIG. 2 illustrates a schematic view of a multi-frame X-ray detector and respective distributed X-ray sources according to an exemplary embodiment of the invention.

FIG. 2 illustrates a schematic view of an arrangement of an X-ray source 90 having a plurality of focal spots 91, 92. The detector 1 receives the radiation irradiated from either of the focal spots 91, 92. The focal spots 91, 92 are activated sequentially, and the detector 1 is multiplexed respectively, in order to distinguish between the radiation irradiated from the first focal spot 91 and a subsequent focal spot 92. The activation of the respective one out of a plurality of focal spots 91, 92 and a respective multiplexing and synchronizing of the detector 1 can be carried out by a control unit 80, so that the detector 1 can be used to take images from a plurality of focal spots 91, 92, or respective X-ray sources. The control device 80 may also be adapted to control a repeated synchronous multiplexed activation of the plurality of charge accumulating units for a respective duration of a sub-frame, wherein multiple temporally distributed sub-frames belonging to a respective one of each of the plurality of charge accumulating units form a time frame. The detector can be read out via a readout line 50 to provide the recorded images to a display device 4. It should be noted that the control unit may also be adapted to synchronize the readout of the detector 1. Reading out only after a plurality of accumulated sub-frames for each of the focal spots and accumulating units reduces the required data rate and improves the signal to noise ratio.

As the focal spots 91, 92 possibly increase very fast to temperatures of about 1000° C. within a very short time of a couple of microseconds, each focal spot can be activated only for a very limited time. However, this very limited time may be not sufficient for providing an imaging signal having a sufficient signal-to-noise ratio, so that it is desired to elongate the total activation time of each of the focal spots. The idea of using distributed X-ray sources rather than rotating anode tubes for e.g. tomographic X-ray imaging systems allows to use a stationary anode having a plurality of X-ray foci, which are distributed for example along a line or an arch, as can be schematically seen from FIG. 2. The foci can be switched very fast, which is of relevance for tomographic systems, as no mechanical movement is needed to take projection images from different angles. Thus, a projection of images from different foci and angles, respectively, can in principle be acquired in rapid succession without motion blur. Such a tomosynthesis system, e.g. for mammography, may require only a limited angular coverage and with this respect, is useful for use of distributed X-ray sources, as no significant enlargement of a detector area is required. However, also in case of a computer tomography system, where projection images with an angular coverage of 180° plus a possible fan angle need to be acquired, for example a combination of a distributed source together with a rotating detector, might be a cost-effective solution, as then an increase of the detector area is not required. Furthermore, such a configuration would also allow the use of a focused anti-dash scatter grid, which is useful for large coverage CT.

X-ray detectors with a rotating anode currently used in X-ray imaging systems usually work in an integrating mode. In this mode, the X-ray photon energy entering a detector pixel is integrated for a fixed time period called a frame. After that, the image (i.e. the pixel values) is read out and integration of a new frame starts. However, the speed of such a detector is given by the frame rate, which is the number of images it can generate per time. In a tomographic imaging system having a distributed X-ray source and an integrating detector, the overall time required to generate a sequence of projection images from each focus is determined entirely by the detector speed, since mechanical movement is not required.

In case, the anode of an X-ray imaging system is stationary, the focal spot temperature will increase very fast to about 1000° C. within a couple of microseconds when using a tube power currently used in the CT or CV systems. As a consequence, the available tube power is very limited in such a system and the advantage of a fast exposition is not effective, as the images become too noisy. The whole sequence has to be repeated several times, such that images from the same location can be averaged in order to arrive at an acceptable signal-to-noise level. In order to utilize the fast exposition potential of the distributed source, a faster switching between the foci is needed in order to keep the available tube power high. This however requires a much faster X-ray detector with an integration period of a couple of microseconds, for example 10 to 15 microseconds, which would cause an incredibly high data rate. When using a shorter time frame integration time without increasing the data rate, the signal-to-noise ratio can be kept better, so that the detector becomes more ideal for X-ray imaging systems with distributed X-ray sources.

Figure 3:
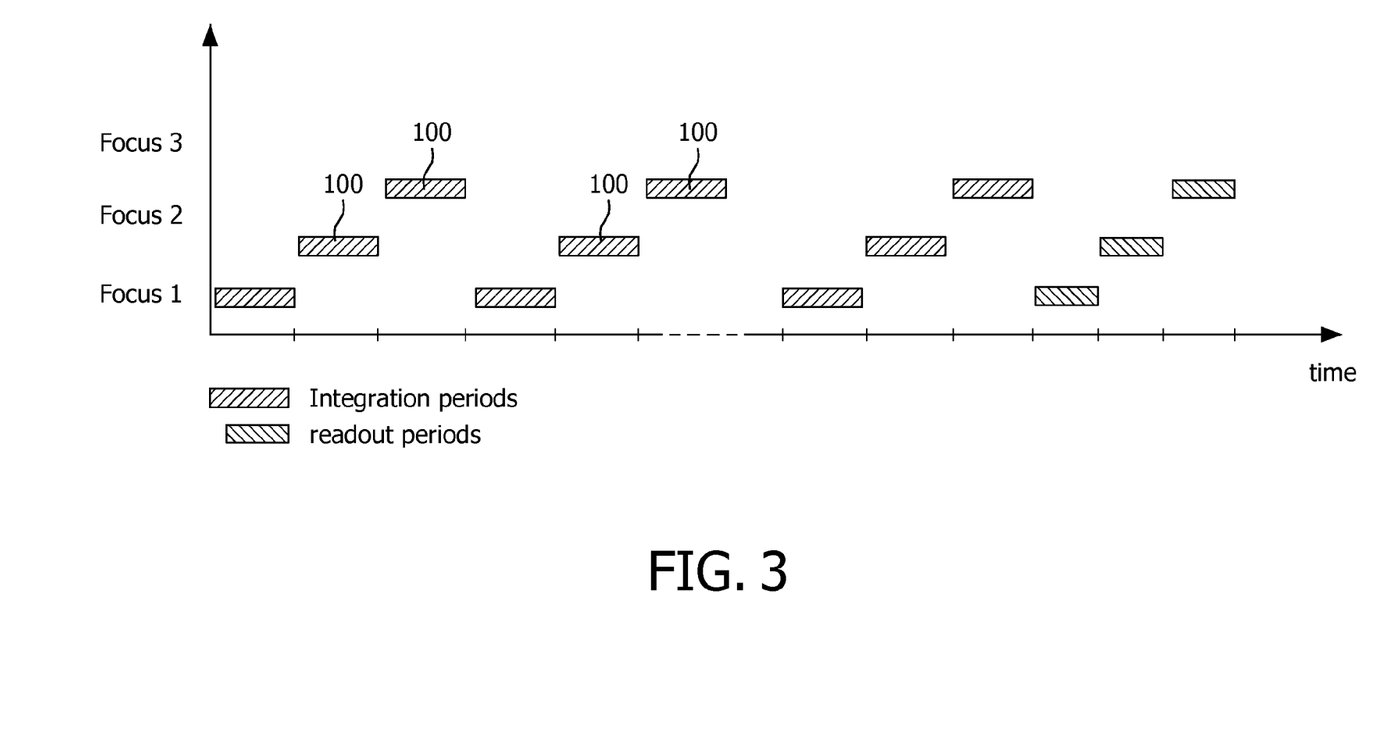
FIG. 3 illustrates a time schedule for integration periods and readout periods according to an exemplary embodiment of the invention.

The present invention provides for a device and a method having a special integrating X-ray detector, which can integrate multiple frames in parallel. Such an operation mode is illustrated in FIG. 3. FIG. 3 illustrates the activation of several foci, here illustrated exemplarily as focus 1, focus 2 and focus 3. Each focus is activated only for a limited integration period, which corresponds to a sub-frame 100. Such a sub-frame is of only limited duration of a couple of microseconds, so that for each focal spot it can be avoided a fast increase of the temperature beyond the safe operating point. By repeating the integration periods after a certain time, each focus and at the same time each of the corresponding allocated detector sections receive the full extent of charge as the sum of partial charges in a sub frame, which is needed for a sufficient signal-to-noise ratio. The sum of each of the sub-frame 100 for each focal spot resulting in the entire time frame which is needed for a sufficient signal-to-noise ratio, so that after reaching the integrated duration of the entire time frame, a readout procedure is carried out for the readout period. Thus, the entire integration time can be kept high, but the temporal impact on the focal spot can be kept low without the need of a read out for each sub-frame, as the readout period starts after a plurality of sub-frames for each focal spot. According to the following example, the total required integration time may be for example 100 microseconds per view for each focal position. This total required integration time than is split up into several periods of for example 10 to 15 microseconds. Each integration period is short enough to prevent overheating of the anode. After an integration period, the active focal spot changes and the integrated signal is kept in a storage device. The integration is continued when the focus returns to this position. After a sufficient number of integration periods, the detector frames are read out. Thus, data transfer occurs at the same data rate as state of the art detectors, for example 10.000 frames per second, whereas the integration periods, i.e. the sub-frames are much smaller, e.g. 10 to 15 microseconds, rather than 100 microseconds.

Figure 4:
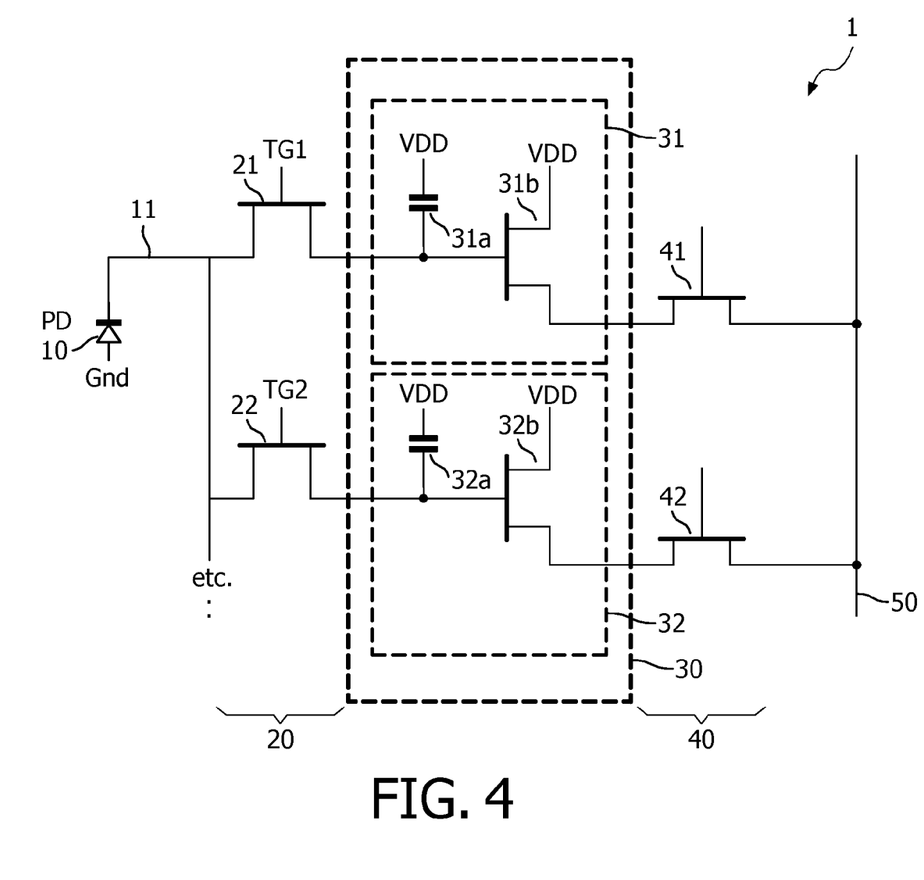
FIG. 4 illustrates a structure of an X-ray detector according to an exemplary embodiment of the invention.

FIG. 4 illustrates an exemplary embodiment of the invention. This embodiment may be used for a flat panel X-ray detector. For this purpose, an X-ray sensitive element 10 is provided, for example in form a photo diode. Such a photodiode can be provided with a scintillator for converting X-ray radiation into radiation for which the photodiode is sensitive. Such scintillators may be made for example of a material comprising CsI having a Tl doping. It should be noted that the X-ray sensitive element also may be an element having a Se or PbO or other photoconductor layer. The X-ray sensitive element is provided with a charge output 11. Further, the detector comprises a charge determination device 30, being adapted to accumulate a plurality of temporally distributed partial charges according to a respective one of a plurality of spatially distributed X-ray sources. The charge determination device 30 is connected to the charge output 11 of the X-ray sensitive element 10 via an accumulation activation device 20. The charge accumulation device is further connected to a readout line via a readout activation device 40. This readout device 40 is adapted for reading out the charge determination device.

The accumulation activation device may be realized for example by a plurality of transfer transistors 21, 22, which can be activated according to the time pattern shown in FIG. 3. The charge accumulation device 30 may be structured as a plurality of parallel charge accumulation units 31, 32 each of which again may comprise a charge accumulation capacity. Thus, the charges delivered from the X-ray sensitive element, e.g. a photo diode 10 can be sequentially provided to a respective storing capacity 31a, 32a, allocated to a respective charge accumulation unit 31, 32. The voltage level of the respective capacitance 31a, 32a can control the respective amplifier 31b, 32b so as to operate as a source follower. The respective voltage corresponding to the signal of the pixel with respect to a particular focal spot can be read out with a readout transistor or switch 41, 42 connecting sequentially the respective accumulation unit 31, 32 to the readout line 50. A reset device (not shown) can be provided in parallel to the respective capacitance 31a, 32a in order to reset the respective capacitance to a default state. The default state may be a fully charged capacity which will be discharged during accumulation or an empty capacity which will be charged during accumulation. The reset devices may be for example provided in form of a switch so that the respective capacitor can be discharged and the gate of the respective amplifier 31b, 32b operating as a source follower can be brought to the Level of VDD.

In practice, before data is acquired, the photo diode 10 of each pixel, which photo diode converts the incoming light into charge, is usually reset, i.e. set to a predefined voltage. The acquisitions of several sub-frames belonging to the same X-ray focus, which together form the signal of the signal frame, can be staggered in time, as described with respect to FIG. 4. With the help of at least two charge transfer devices 21, 22, the charge belonging to a certain X-ray focal spot is transferred to the associated storage capacitor 31a, 32a. The charge transfer devices maybe realized as charge transfer transistors. The photo diode should maintain the voltage irrespective of the charge condition of the capacitors 31a, 32a. When realizing the charge transfer devices as transistors, the gates thereof can be kept on a lower but fixed voltage above the threshold voltage of the transistor. In case the photo diode does not provide a current, the source terminal of the transistor is a threshold voltage below the gate voltage. In case the photo diode provides charges, i.e. current, the source voltage decreases by a minute amount, the transistor starts to be conductive and transfers the charges to the charge storage capacitor. When the current of the photodiode stops, the voltage of the source increases to the initial voltage and the current reduces to zero. Thus the charge transfer device keeps the voltage of the photo diode constant whereas the drain can take almost any arbitrary voltage levels. Thus, a feedback effect to the photodiode can be avoided. When the first focal spot is activated, a first charge transfer transistor 21 is activated by pulling its gate TG1 to an intermediate voltage. The charge transfer transistor 21 then transfers the charge to a first storage capacitor 31a. When the second focal spot is activated, a second charge transfer transistor 22 is activated, while the other charge transfer transistor are deactivated, by pulling its gate TG2 to an intermediate voltage so that the charge from the photo diode can then be transferred to the second storage capacitor 32a. For each focal spot position there is one branch with a charge transfer transistor and a storage capacitor. The charge is stored on the storage capacitor 31a, 32a and can be read out as a charge, i.e. like in a passive pixel with a readout switch, which is not shown in FIG. 4, or the charges can be converted into a voltage on the storage capacitor 31a, 32a and the corresponding voltage is read out, i.e. like in an active pixel with a source follower operating as an amplifier 31b, 32b and a respective readout switch 41, 42, as shown in FIG. 4.

Figure 5:
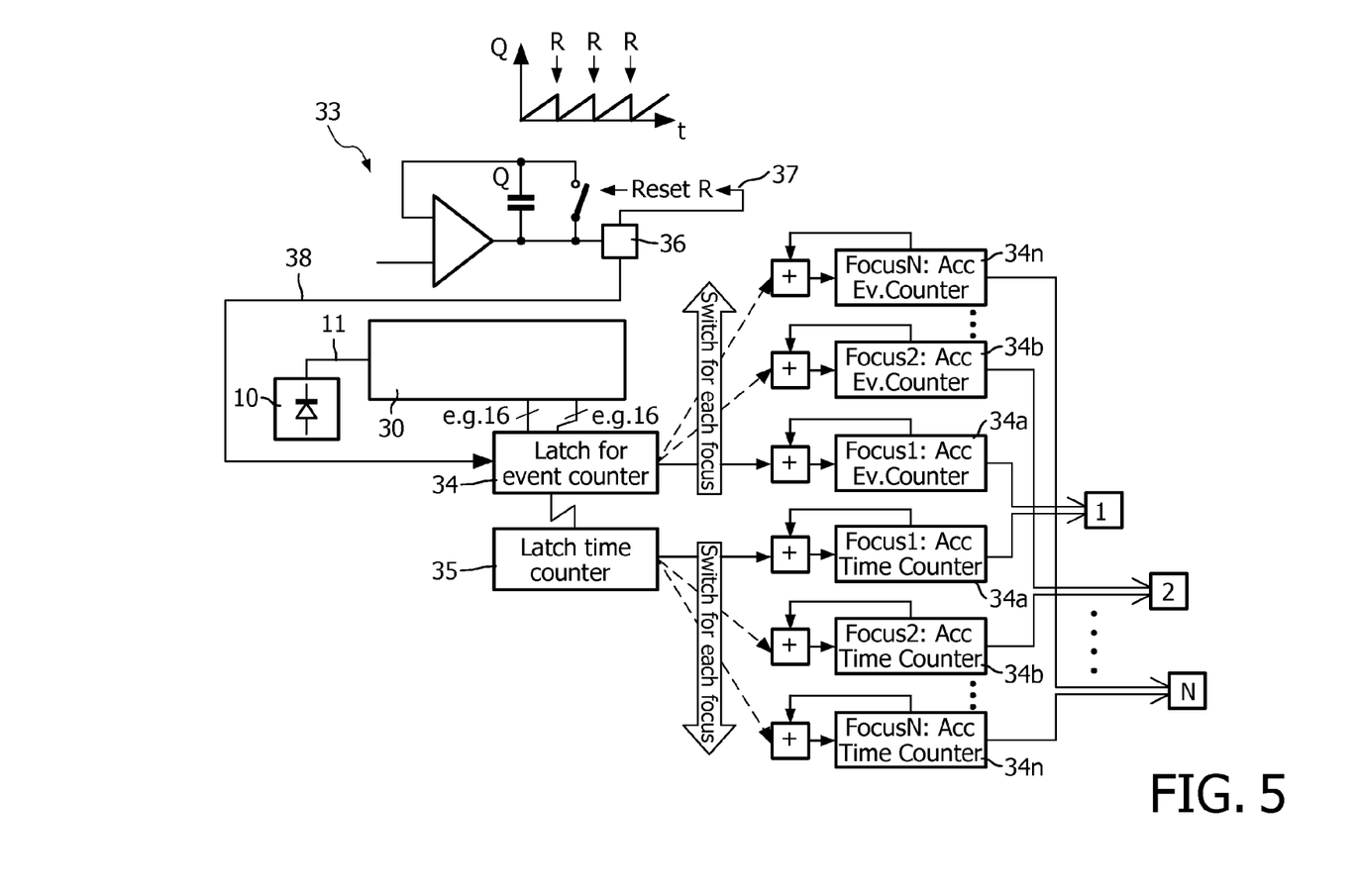
FIG. 5 illustrates a further structure of an X-ray detector according to an alternative exemplary embodiment of the invention.

An alternative embodiment of the invention is illustrated with respect to FIG. 5. FIG. 5 also illustrates an X-ray sensitive element 10 having a charge output 11, as described above with respect to FIG. 4. The charge determination device 30 being adapted to accumulate a plurality of temporally distributed partial charges according to a respective one of a plurality of spatially distributed X-ray sources by using for example a common charge unit integrator 33. This charge unit integrator 33 can be used for each of the focal spots. However, it should be understood, that also a full charge unit integrator (i.e. each with its own event counter and time counter) can be provided for each of the focal spots, which, however, will increase the number of charge unit integrators. Such a charge unit integrator 33 can be realized by an operational amplifier with a charge capacity being capable of storing a certain charge unit, wherein the charge capacity Q is reset when full, wherein the reset event is counted by a counter. The recognition of the full charge capacity, the triggering of the reset and the counting of the resets can be carried out by a discriminator with counter 36. The reset may be triggered via a respective line 37, wherein the counting result may be transferred to a latch for event counter 34 via a respective connection 38. The latch for event counter 34 then distributes the counts to the respective focal accumulator 34a, 34b ... 34n. Thus a multiplexing of the counting may be realized, which may be functionally considered as a multiplex counter. This multiplex counter is adapted to count resets of the charge unit integrator according to a respective one of the plurality of spatially distributed X-ray sources 91, 92 as a measure of the total charge quantity of a respective partial charge. A control device (not shown in FIG. 5, but described with respect to FIG. 2, may control a repeated synchronous multiplexed activation of the plurality of charge accumulating units for a respective duration of a sub-frame, either in form of discrete units 31, 32 as described with respect to FIG. 4, or in form of a multiplex counter 34, 34a, 34b, 36 as described with respect to FIG. 5, wherein multiple temporally distributed sub-frames form a time frame.

Thus, the charge capacitor maintains the charge Q and is repeatedly reset according to a pattern also shown on top of FIG. 5. Thus, the charge quantity can be determined by counting the respective number of resets during a sub-frame as a measure of the totally accumulated charges. When switching for the next focal spot, the counter counts the resets for the next focal spot. This procedure will be repeated for each of the focal spots. Thus the charge quantity can be determined by counting the resets, i.e. the charge packets of the capacitor. In case this procedure is not sufficiently exact enough owing to the quantization of the charges, the charge estimation can be improved based on the respective duration of the sub-frame. For this purpose a time counter can be provided, as will be described in the following and known from R. Luhta et al, A new 2D-tiled detector for multi-slice CT, SPIE 2006 (6142), where however the linkage between different focal spot positions is not disclosed.

In addition, the charge accumulating device 30 further may comprise a time counter 35 for determining a duration of a sub-frame during which each of partial charges transfers. This time can be accumulated by a latch time counter 35 according to each of the respective focal spots. Thus, for each of the focal spots a respective number N of reset events and a respective time can be provided so as to determine the accumulated charge.

While in flat X-ray detector usually the integrating capacitance is reset at the end of a frame, in CT, one tries to avoid a reset due to the required higher frame rate. A charge determination device 30 may continuously analogue to digital convert the current from the photo diode without any reset between the frames. In order to facilitate the above-described idea of time staggered sub-frames belonging to the same view or focus, the charge determination device 30 can be designed to cope with shorter integration periods in order not to increase the focal spot temperature. This means that the charge packets have to be made smaller so that with given bias current at least two pump events occur during a sub-frame. The charge determination device 30 is designed for dealing with measuring mean currents and therefore mean charges within a much shorter sub-frame. The digital results of the time-counter 35 and the event counter 34 of the staggered sub-frames, which belong to the same focus, will be accumulated so that they can be read out, when all sub-frames of a frame have been seen. The individual event counter and time counter values resulting for each focus of the accumulation may be read out or already processed digitally before read out in order to provide an estimate of the mean charge according to the formula (NP−1)/NT, where NP is the number of pump events provided by the event counter 34, and NT is the number of clock ticks counted in the time counter 35. For readout concepts for CT using a simple integrating capacitor, the same approach can be taken as described for flat X-ray detectors above.

The accumulated charge can be calculated as $$Q_{total}=((NP-1)/NT)*NF*PC,$$

With NF as the number of sub-frames and PC as the quantity of the partial charges, given the sub-frame is the same for each focal spot. Otherwise NF will be replaced by a sum formula over each individual sub-frame duration.

It should be noted that for the devices and the method the number of units is not limited to the number of two, i.e. not limited to the respective first and second element, but may be also of larger numbers.

A compromise solution for keeping the circuit complexity and power consumption low may be implementing the charge integrator 30 with a single operational amplifier, however with N different feedback capacitances and reset switches. At a time, only one feedback capacitance (with reset switch) may be connected to the operational amplifier. When the next focal spot position is visited, the corresponding feedback capacitance is connected to the operational amplifier. Thus it is made sure that the residual charge on the feedback capacitance belonging to the focal spot position k is not lost or falsifies the charge measurement for focal spot position k+1. This under certain circumstances may introduce additional kT/C noise. Recharging processes when switching between focal spot positions (and the corresponding feedback capacitances) may be provided with additional means for reduction of substrate noise.

In another exemplary embodiment of the present invention, a computer program or a computer program element is provided that is characterized by being adapted to execute the method steps of the method according to one of the preceding embodiments, on an appropriate system.

The computer program element might therefore be stored on a computer unit, which might also be part of an embodiment of the present invention. This computing unit may be adapted to perform or induce a performing of the steps of the method described above. Moreover, it may be adapted to operate the components of the above described apparatus. The computing unit can be adapted to operate automatically and/or to execute the orders of a user. A computer program may be loaded into a working memory of a data processor. The data processor may thus be equipped to carry out the method of the invention.

This exemplary embodiment of the invention covers both, a computer program that right from the beginning uses the invention and a computer program that by means of an update turns an existing program into a program that uses the invention.

Further on, the computer program element might be able to provide all necessary steps to fulfill the procedure of an exemplary embodiment of the method as described above.

According to a further exemplary embodiment of the present invention, a computer readable medium, such as a CD-ROM, is presented wherein the computer readable medium has a computer program element stored on it which computer program element is described by the preceding section.

However, the computer program may also be presented over a network like the World Wide Web and can be downloaded into the working memory of a data processor from such a network. According to a further exemplary embodiment of the present invention, a medium for making a computer program element available for downloading is provided, which computer program element is arranged to perform a method according to one of the previously described embodiments of the invention.

It has to be noted that embodiments of the invention are described with reference to different subject matters. In particular, some embodiments are described with reference to method type claims whereas other embodiments are described with reference to the device type claims. However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

It has to be noted that exemplary embodiments of the invention are described with reference to different subject matters. In particular, some exemplary embodiments are described with reference to apparatus type claims whereas other exemplary embodiments are described with reference to method type claims. However, a person skilled in the art will gather from the above and the following description that, unless other notified, in addition to any combination of features belonging to one type of subject matter also any combination between features relating to different subject matters, in particular between features of the apparatus type claims and features of the method type claims is considered to be disclosed with this application.

In the claims, the word "comprising" does not exclude other elements or steps, and the indefinite article "a" or "an" does not exclude a plurality. A single processor or other unit may fulfill the functions of several items re-cited in the claims. The mere fact that certain measures are re-cited in mutually different dependent claims does not indicate that a combination of these measures cannot be used to advantage.

A computer program may be stored and/or distributed on a suitable medium, such as an optical storage medium or a solid state medium supplied together with or as part of other hardware, but may also be distributed in other forms, such as via the internet or other wired or wireless telecommunication systems.

LIST OF REFERENCE SIGNS

1 X-ray detector
2 X-ray detector array
3 X-ray imaging system
4 display unit
10 X-ray sensitive element
11 charge output
20 accumulation activation device
21, 22 charge transfer devices
30 charge determination device
31, 32 charge accumulating unit
31a, 32a charge accumulation capacity
31b, 32b amplifier/source follower
33 charge unit integrator
34 latch for event counter
34a, 34b, 34n focus accumulation event counter
35 time counter
35a, 35b, 35n focus accumulation time counter
36 discriminator and counter
37 reset line
38 count transfer line
40 read out device
41, 42 read out activation switches
50 read out line
80 control device
90 anode
91, 92 focal spot
100 sub-frames

The invention claimed is:

1. An X-ray detector comprising:
an X-ray sensitive element having a charge output,
a charge accumulation device adapted to accumulate a plurality of temporally distributed partial charges according to a respective one of a plurality of spatially distributed X-ray sources, and
a read out activation device adapted for reading out the charge accumulation device after accumulation of the plurality of temporally distributed partial charges to so obtain a total charge for the respective one of the plurality of spatially distributed X-ray sources,
wherein the charge accumulation device is connected to the charge output of the X-ray sensitive element via an accumulation activation device,
wherein the charge accumulation device is connected to a read out line via said read out activation device.

2. The X-ray detector according to claim 1, wherein the charge accumulation device comprises a common charge unit integrator having a reset-when-full-function and a subsequent multiplex counter, wherein the charge unit integrator is adapted to subsequently integrate each of the plurality of temporally distributed partial charges, and the multiplex counter is adapted to count resets of the charge unit integrator according to a respective one of the plurality of spatially distributed X-ray sources as a measure of a total charge quantity of a respective partial charge.

3. The X-ray detector according to claim 2, wherein the charge accumulating device further comprises a time counter for determining a duration of a sub-frame during which each of the partial charges transfers.

4. An X-ray detector array comprising a plurality of X-ray detectors (1) according to claim 1.

5. An X-ray imaging system comprising: a plurality of spatially distributed X-ray sources; an X-ray detector according to claim 1; a control device; wherein the control device is adapted to control a synchronizing of the accumulation of a plurality of temporally distributed partial charges in the charge accumulating device according to a respective one of the plurality of spatially distributed X-ray sources.

6. The X-ray imaging system according to claim 5, wherein the control device is adapted to control a sequential read out of each of the accumulated partial charges after a predetermined duration of the timeframe.

7. The X-ray imaging system according to claim 5, wherein the charge accumulating device comprises a plurality of charge accumulation units, wherein each of the plurality of distributed X-ray sources is allocated to a respective charge accumulating unit.

8. The X-ray imaging system according to claim 7, wherein the control device is adapted to control a synchronous multiplexed activation of a plurality of charge accumulating units for a respective duration of a sub-frame according to an activation of the respective allocated X-ray source out of the plurality of spatially distributed X-ray sources.

9. The X-ray detector of claim 1, said read out device being configured for, to obtain said total charge, deferring reading out said charge accumulation device until after said accumulation of the plurality of temporally distributed partial charges.

10. The X-ray detector of claim 1, said plurality of sources amounting to more than two sources.

11. An X-ray detector comprising:
an X-ray sensitive element having a charge output,
a charge accumulation device being adapted to accumulate, from said element via said charge output, a plurality of temporally distributed partial charges according to a respective one of a plurality of spatially distributed X-ray sources, and
a read out activation device being adapted for reading out the charge accumulation device,
wherein the charge accumulation device is connected to the charge output of the X-ray sensitive element via an accumulation activation device,
wherein the charge accumulation device is adapted to accumulate the plural charges during a respective plurality of temporally distributed sub-frames so as to obtain a total charge for a total timeframe.

12. The X-ray detector according to claim 11, wherein the charge accumulation device comprises a plurality of charge accumulating units, wherein the accumulation activation device comprises a plurality of charge transfer devices, wherein the read out activation device comprises a plurality of read out activation switches, wherein each of the plurality of charge accumulating units is connected to said charge output via a respective charge transfer device and wherein each of the plurality of charge accumulating units is connected to the read out line via a respective read out activation switch.

13. The X-ray detector according to claim 12, further comprising a control device adapted for multiplexing the plurality of charge transfer devices according to an activation of a respective focal spot out of a plurality of distributed focal spots.

14. The X-ray detector according to claim 13, wherein each of the plurality of the charge accumulation units comprises a charge accumulation capacity and an amplifier, an input of the amplifier being connected to the charge accumulation capacity and an output of the amplifier being connected to the read out line via a respective one of the plurality of the read out activation switches.

15. The X-ray detector of claim 11, X-ray acquisition via said X-ray sensitive element for said timeframe corresponding to, for said respective one of the plural sources, a single readout of said read out device.

16. The X-ray detector of claim 11, each of said sub-frames having a duration of no more than 2 microseconds.

17. The X-ray detector of claim 11, each of said sub-frames being of equal duration.

18. The X-ray detector of claim 11, said plurality of sources amounting to more than two sources.

19. A method for multiframe X-ray detection with distributed X-ray sources, comprising:
synchronously activating a first charge accumulation section for a duration of a first predetermined sub-frame and a first X-ray source out of a plurality of distributed X-ray sources,
synchronously switching activating from the first charge accumulation section to a second charge accumulating section for a duration of a second predetermined sub-frame and from a first X-ray source to a second X-ray source out of a plurality of distributed X-ray sources,
repeating synchronously activating and synchronously switching activating until lapse of a predetermined time frame for each of the first and second charge accumulation section, the time frame consisting of a plurality of sub-frames, for the accumulation of a plurality of temporally distributed partial charges according to an origin of a respective one of the plurality of spatially distributed X-ray sources, and
sequentially reading out the first charge accumulation section and the second charge accumulation section after lapse of the predetermined time frame for each of the first and second charge accumulation section.

20. The method of claim 19, further comprising:
synchronously switching activating from the second charge accumulation section to a third charge accumulating section for a duration of a third predetermined sub-frame and from a second X-ray source to a third X-ray source out of a plurality of distributed X-ray sources,
said repeating being performed until lapse of a predetermined time frame for the third charge accumulation section, the time frame consisting of a plurality of sub-frames, for the accumulation of a plurality of temporally distributed partial charges according to an origin of a respective one of the plurality of spatially distributed X-ray sources,
the sequential reading out entailing sequentially reading out the first charge accumulation section, the second charge accumulation section, and the third charge accumulation section after lapse of the predetermined time frame for each of the first, second, and third charge accumulation section.

21. A non-transitory computer readable medium embodying a computer program for multiframe X-ray detection with distributed X-ray sources, said program having instructions executable by a processor for performing a plurality of acts, among said plurality there being the acts of:
synchronously activating a first charge accumulation section for a duration of a first predetermined sub-frame and a first X-ray source out of a plurality of distributed X-ray sources,
synchronously switching activating from the first charge accumulation section to a second charge accumulating section for a duration of a second predetermined sub-frame and from a first X-ray source to a second X-ray source out of a plurality of distributed X-ray sources,
repeating synchronously activating and synchronously switching activating until lapse of a predetermined time frame for each of the first and second charge accumulation section, the time frame consisting of a plurality of sub-frames, for the accumulation of a plurality of temporally distributed partial charges according to an origin of a respective one of the plurality of spatially distributed X-ray sources, and
sequentially reading out of the first charge accumulation section and the second charge accumulation sections after lapse of the predetermined time frame for each of the first and second charge accumulation section.

22. The computer readable medium of claim 21, said accumulation of partial charges being an accumulation of partial charges of a total charge, said sequentially reading out entailing reading out the total charge from the first charge accumulation section.

23. The computer readable medium of claim 21, the partial charges for said origin progressively accumulating to yield a total charge for the respective predetermined time frame.

24. The computer readable medium of claim 21, among the plural acts there being the further act of:
synchronously switching activating from the second charge accumulation section to a third charge accumulating section for a duration of a third predetermined sub-frame and from a second X-ray source to a third X-ray source out of a plurality of distributed X-ray sources,
said repeating being performed until lapse of a predetermined time frame for the third charge accumulation section, the time frame consisting of a plurality of sub-frames, for the accumulation of a plurality of temporally distributed partial charges according to an origin of a respective one of the plurality of spatially distributed X-ray sources,
the sequential reading out entailing sequentially reading out the first charge accumulation section, the second charge accumulation section, and the third charge accumulation section after lapse of the predetermined time frame for each of the first, second, and third charge accumulation section.

* * * * *